United States Patent
Lee et al.

(10) Patent No.: US 10,983,373 B2
(45) Date of Patent: Apr. 20, 2021

(54) DISPLAY DEVICE

(71) Applicant: LG DISPLAY CO., LTD., Seoul (KR)

(72) Inventors: JooHong Lee, Seoul (KR); SeoungJin Park, Daegu (KR); Moohyoung Song, Daegu (KR); SangRyeon Park, Gyeongbuk (KR); TaeYoung Jung, Daegu (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 16/230,398

(22) Filed: Dec. 21, 2018

(65) Prior Publication Data

US 2019/0121170 A1    Apr. 25, 2019

Related U.S. Application Data

(62) Division of application No. 13/585,987, filed on Aug. 15, 2012, now abandoned.

(30) Foreign Application Priority Data

Sep. 29, 2011  (KR) .................. 10-2011-0099360

(51) Int. Cl.
*G02F 1/13* (2006.01)
*G02F 1/133* (2006.01)
(Continued)

(52) U.S. Cl.
CPC ............. *G02F 1/13* (2013.01); *G02F 1/133* (2013.01); *G02F 1/1345* (2013.01);
(Continued)

(58) Field of Classification Search
None
See application file for complete search history.

(56) References Cited

U.S. PATENT DOCUMENTS 6,498,592 B1   12/2002  Matthies
6,529,257 B1    3/2003  Nakano
(Continued)

FOREIGN PATENT DOCUMENTS

CN    101435939 A    5/2009
CN    102162941 A    8/2011
(Continued)

OTHER PUBLICATIONS

Chinese Office Action issued in Chinese Patent Application No. 201210189128.8 dated Oct. 15, 2014.
(Continued)

*Primary Examiner* — Christopher R Lamb
(74) *Attorney, Agent, or Firm* — Morgan, Lewis & Bockius LLP (57) ABSTRACT

A display device comprises a display panel including a main display region and a periphery region outside the main display region; and a panel driver connected with the display panel in the periphery region of the display panel, wherein the display panel includes an upper substrate and a lower substrate formed under a lower surface of the upper substrate, and the lower substrate is formed to expose a pad region provided on the lower surface of the upper substrate, and the panel driver is connected to the pad region provided on the lower surface of the upper substrate.

20 Claims, 9 Drawing Sheets

(51) Int. Cl.
*G02F 1/1362* (2006.01)
*G09F 9/30* (2006.01)
*G09F 9/35* (2006.01)
*G09G 3/20* (2006.01)
*G02F 1/1345* (2006.01)

(52) U.S. Cl.
CPC ........ *G02F 1/1362* (2013.01); *G02F 1/13452* (2013.01); *G09F 9/30* (2013.01); *G09F 9/35* (2013.01); *G09G 3/20* (2013.01)

(56) References Cited

U.S. PATENT DOCUMENTS

| | | | |
|---|---|---|---|
| 7,259,806 | B1 | 8/2007 | Lee et al. |
| 7,633,473 | B2 | 12/2009 | Uh et al. |
| 7,839,396 | B2 | 11/2010 | Yang et al. |
| 8,253,891 | B2 | 8/2012 | Yu et al. |
| 8,770,820 | B2 | 7/2014 | Cho et al. |
| 2002/0044251 | A1 | 4/2002 | Togashi et al. |
| 2002/0044329 | A1* | 4/2002 | Shoji ............ G02F 1/13452 359/245 |
| 2004/0245533 | A1 | 12/2004 | Imazeki et al. |
| 2005/0241853 | A1 | 11/2005 | Aoki |
| 2006/0092345 | A1* | 5/2006 | Takeuchi ............ G02F 1/13452 349/60 |
| 2007/0091242 | A1* | 4/2007 | Oohira ............ H05K 1/189 349/149 |
| 2008/0018626 | A1 | 1/2008 | Yang et al. |
| 2009/0096754 | A1 | 4/2009 | Hinata |
| 2009/0310057 | A1 | 12/2009 | Kang et al. |
| 2010/0103354 | A1 | 4/2010 | Yu et al. |
| 2011/0080348 | A1 | 4/2011 | Lin et al. |
| 2011/0216556 | A1 | 9/2011 | Cho et al. |
| 2011/0241553 | A1 | 10/2011 | Schindler |
| 2011/0304791 | A1 | 12/2011 | Takahashi et al. |
| 2012/0162587 | A1 | 6/2012 | Oohira |
| 2012/0250289 | A1* | 10/2012 | Kao ..................... G06F 1/1637 362/97.1 |
| 2013/0057801 | A1 | 3/2013 | Park et al. |

FOREIGN PATENT DOCUMENTS

| | | |
|---|---|---|
| CN | 102193219 A | 9/2011 |
| CN | 102981329 A | 3/2013 |
| EP | 2 746 842 A1 | 6/2014 |
| JP | 58-179824 A | 10/1982 |
| JP | H05-281529 A | 10/1993 |
| JP | 2004-4581 A | 1/2004 |
| JP | 2004-78239 A | 3/2004 |
| JP | 2007-272126 A | 10/2007 |
| JP | 2008209529 A | 9/2008 |
| JP | 2009-151190 A | 7/2009 |
| JP | 2010-78625 A | 4/2010 |
| KR | 2008-0008751 A | 1/2008 |
| KR | 2009-0111522 A | 10/2009 |
| KR | 2010-0046779 A | 5/2010 |
| KR | 2011-0100039 A | 9/2011 |
| TW | 201122640 A | 7/2011 |

OTHER PUBLICATIONS

Taiwan Office Action issued in Taiwanese Patent Application No. 101124089 on Dec. 22, 2014.
German Office Action issued in German Patent Application No. 10 2012 104 859.2 dated Apr. 16, 2015.
Korean Office Action dated Jun. 16, 2017 in corresponding Korean Patent Application No. 10-2011-0099360.

* cited by examiner

DISPLAY DEVICE

CROSS REFERENCE TO RELATED APPLICATIONS

This application is a Divisional of U.S. patent application Ser. No. 13/585,987, filed on Aug. 15, 2012, which claims the benefit of the Korean Patent Application No. 10-2011-0099360 filed on Sep. 29, 2011. Each of the above-identified U.S. and Korean Patent Applications is hereby incorporated by reference for all purposes as if fully set forth herein.

BACKGROUND OF THE INVENTION

Field of the Invention

The present invention relates to a display device, and more particularly, to a display device having a thin thickness and a design improved in a sense of beauty.

Discussion of the Related Art

Recently, various display devices, which can substitute for a cathode ray tube which is a display device in the early stage, have been developed. Examples of the display devices include a liquid crystal display device, a plasma display panel, and an organic light emitting display device.

The display device has realized a large size by reducing weight and volume and has been greatly developed in view of quality such as response speed or picture quality owing to the continuous research and development.

In addition to the research and development in technical aspects such as response speed or picture quality, the research and development in design aspects of products that can appeal to consumers is ongoing. In other words, the development of a design having improved sense of beauty and minimizing the thickness of the display device is ongoing, which can stimulate purchasing by appealing to consumers.

However, the display device developed until now has limitation in minimizing or reducing the thickness and increasing a sense of beauty due to its structural characteristics. Hereinafter, the limitation of the display device according to the related art will be described with reference to the accompanying drawing.

Figure 1:
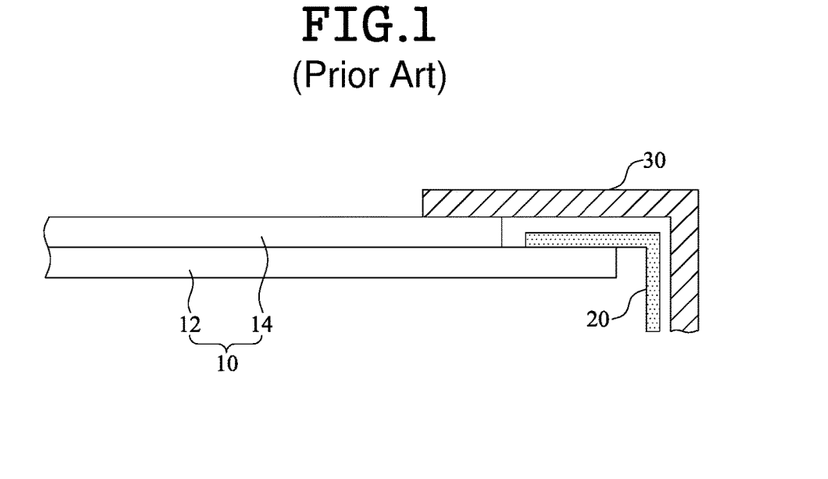
FIG. 1 is a cross-sectional view illustrating a display device according to the related art.

FIG. 1 is a cross-sectional view illustrating a display device according to the related art.

Referring to FIG. 1, the display device according to the related art includes a display panel 10, a panel driver 20, and an external case 30.

The display panel 10 includes a lower substrate 12 and an upper substrate 14.

On the lower substrate 12, gate lines are formed to cross data lines, thereby defining a pixel region. A thin film transistor is formed in a region where the gate lines cross the data lines, and a pixel electrode connected with the thin film transistor is formed in the pixel region.

The upper substrate 14 is formed over the lower substrate 12. At this time, to apply a signal to the gate and data lines formed on the lower substrate 12, a periphery region at one side of the lower substrate 12 should externally be exposed, whereby the upper substrate 14 is not formed in the periphery region at one side of the lower substrate 12.

The panel driver 20 is formed in the periphery region at one side of the lower substrate 12 externally exposed, and transfers a signal to the gate and data lines.

The external case 30 is formed to cover a periphery region of the display panel 10. As described above, since the panel driver 20 is formed in the periphery region at one side of the lower substrate 12, it is required to prevent the panel driver 20 from being externally exposed. To this end, the external case 30 is used.

As described above, the external case 30 is formed to cover the periphery region of the display panel 10 to prevent the panel driver 20 from being exposed. The external case 30 is formed above the upper substrate 14 due to its structural characteristics. For this reason, the following problems may occur.

First of all, since the external case 30 is formed above the upper substrate 14, a problem occurs in that the thickness of the display device is increased correspondingly.

Also, since the external case 30 is formed above the upper substrate 14, step difference occurs on a front surface of the display device, whereby a sense of beauty is deteriorated.

Moreover, since the external case 30 should prevent the panel driver 20 from being exposed, a width of the external case 30, that is, a width of a bezel of the display device is increased, whereby a sense of beauty is deteriorated.

SUMMARY OF THE INVENTION

Accordingly, the present invention is directed to a display device that substantially obviates one or more problems due to limitations and disadvantages of the related art.

An advantage of the present invention is to provide a display device having a minimized thickness and improved sense of beauty.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a display device according to the present invention comprises a display panel including a main display region and a periphery region outside the main display region; and a panel driver connected with the display panel in the periphery region of the display panel, wherein the display panel includes an upper substrate and a lower substrate formed under a lower surface of the upper substrate, and the lower substrate is formed to expose a pad region provided on the lower surface of the upper substrate, and the panel driver is connected to the pad region provided on the lower surface of the upper substrate. It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the exemplary embodiments of the present invention, examples of which are illustrated in the accompanying drawings. Wherever possible, the same reference numbers will be used throughout the drawings to refer to the same or like parts.

Figure 2:
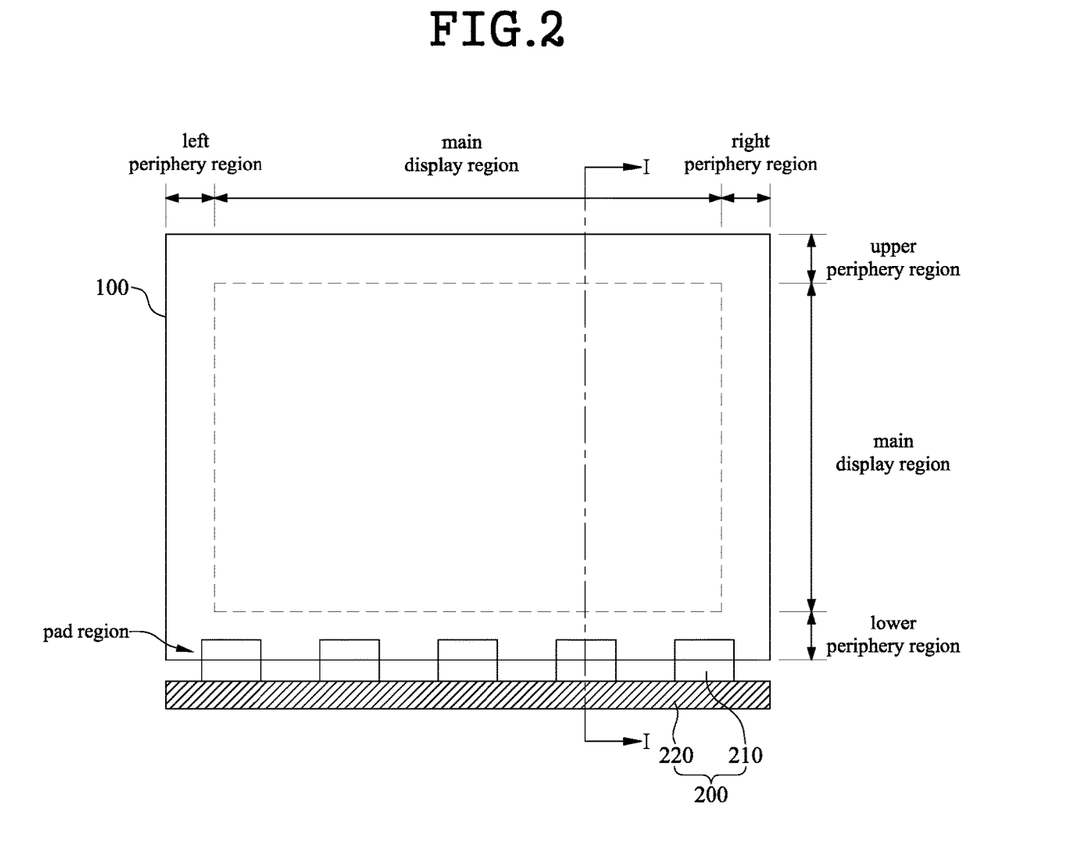
FIG. 2 is a plane view illustrating a display device according to one embodiment of the present invention.

FIG. 2 is a plane view illustrating a display device according to one embodiment of the present invention.

As shown in FIG. 2, the display device according to one embodiment of the present invention includes a display panel 100 and a panel driver 200 connected to the display panel 100.

The display panel 100 includes a main display region and a periphery region outside the main display region.

The main display region is located at the center of the display panel 100 and displays a main screen such as moving picture.

The periphery region is located in the periphery of the display panel 100 and includes an edge region of the display panel 100. Although a main screen such as moving picture is not displayed in the periphery region, a sub screen such as advertisements, manufacturer logo, channel information, time information, volume information or caption may be display in the periphery region. Namely, a sub display region displaying the sub screen may be formed in the periphery region, and its detailed description will be made later.

The periphery region may include a left periphery region, a right periphery region, an upper periphery region, and a lower periphery region, which are respectively arranged at a left side, a right side, an upper side and a lower side based on the main display region. A pad region is formed in some of the respective periphery regions. The pad region is the region where a pad for applying a signal to the display panel 100 is formed. Although the pad region is formed in the lower periphery region as shown, its arrangement may not be limited to the example of the drawing.

The panel driver 200 is connected to the periphery region of the display panel, more specifically the pad region. The panel driver 200 includes a circuit film 210 and a printed circuit board (PCB) 220.

The circuit film 210 is formed in such a manner that a plurality of circuit films are attached to the pad region of the display panel 100 at predetermined intervals. The plurality of circuit films 210 are connected to the printed circuit board 220.

Although not shown, a chip such as a data driving integrated circuit may be formed on the circuit films 210 to form a chip on film (COF) structure, or the chip may be formed on the display panel to form a chip on glass (COG) structure.

The printed circuit board 220 provides various signals to the display panel 100 through the circuit films 210. Although not shown, a timing controller, various power circuits, or a memory device is packaged on the printed circuit board 220.

Although the circuit films 210 are arranged to be unfolded in the drawing, they may be arranged in a folded state to minimize increase of a non-display region where picture image is not displayed. This will easily be understood with reference to a cross-sectional view which will be described later.

Figure 3A:
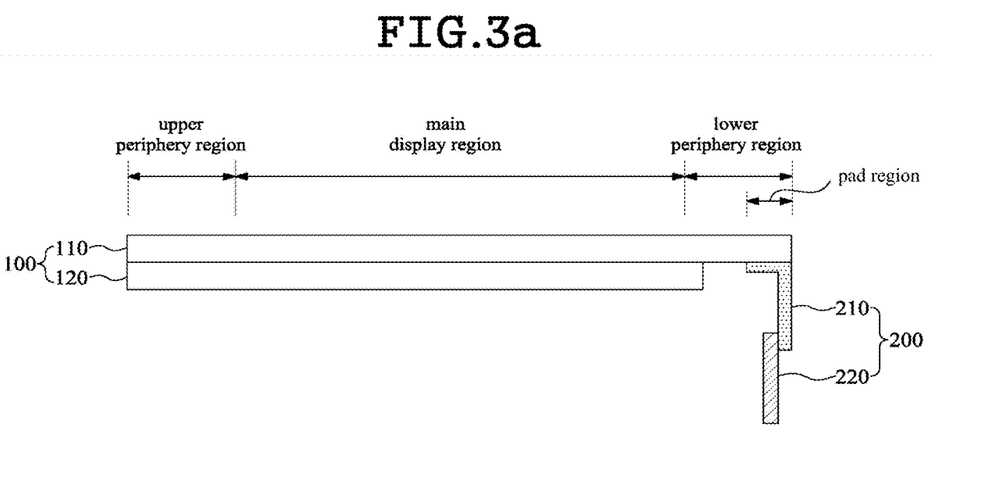
FIGS. 3a to 3c are cross-sectional views illustrating a display device according to various embodiments of the present invention.
Figure 3B:
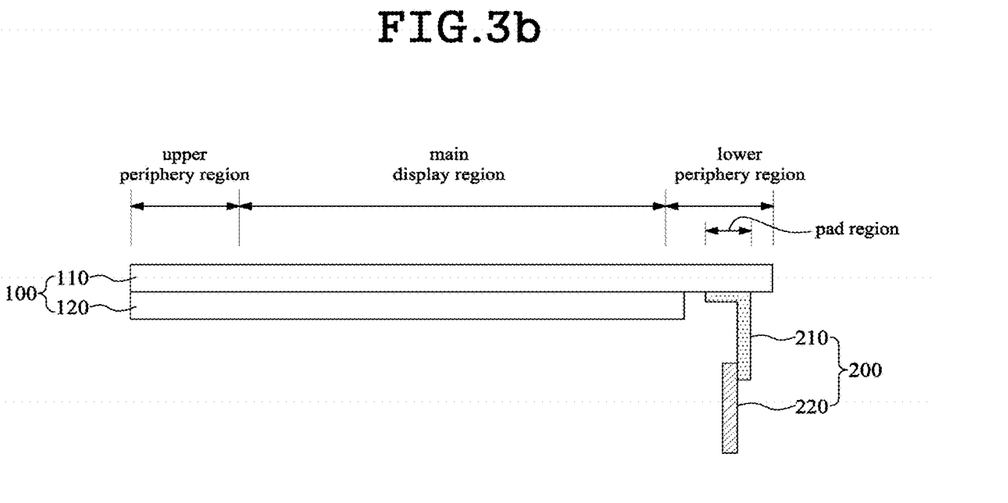
Figure 3C:
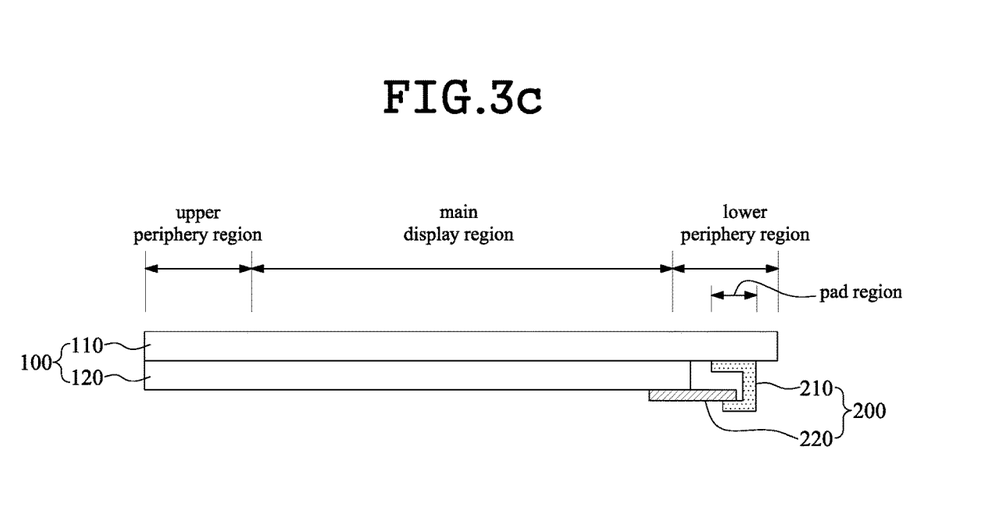

FIGS. 3a to 3c are cross-sectional views illustrating a display device according to various embodiments of the present invention, and correspond to sections taken along line I-I of FIG. 2.

As shown in FIGS. 3a to 3c, the display device according to the present invention includes a display panel 100 and a panel driver 200.

The display panel 100 includes an upper substrate 110 and a lower substrate 120. In the case that the display panel 100 is a liquid crystal panel, a liquid crystal layer sealed by a sealant is formed between the upper substrate 110 and the lower substrate 120. Hereinafter, the case where the display panel 100 is the liquid crystal panel will be described in detail.

Although not shown, gate and data lines are formed on the upper substrate 110, more specifically on a lower surface of the upper substrate 100 facing the lower substrate 120, wherein the gate lines are arranged to cross the data lines, thereby defining pixel regions. A thin film transistor serving as a switching device is formed in each region where the gate lines cross the data lines. A pixel electrode connected to the thin film transistor is formed in each of the pixel regions.

As described above, in the display device according to the present invention, the thin film transistor substrate constitutes the upper substrate 110. Accordingly, the panel driver 200 for applying a signal to the gate lines and the data lines is attached to the lower surface of the upper substrate 110, whereby the panel driver 200 is not exposed to a front surface of the display device. In other words, the entire front surface of the display panel 100 is externally exposed.

As a result, since a separate external case for covering the exposed panel driver 200 is not required on the upper surface of the upper substrate 110, a thickness of the display device is reduced and a front step difference of the display device is removed, whereby the front surface of the display device is recognized as one structure to obtain esthetic design effect.

As described above, since the panel driver 200 is connected on the lower surface of the upper substrate 110, the lower substrate 120 is formed to make the pad region of the upper substrate 110 externally exposed. In more detail, the upper substrate 110 is extended longer than the lower substrate 120 in the lower periphery region where the pad region is provided.

Meanwhile, as shown in FIGS. 3a to 3c, one end of the upper substrate 110 may be formed to correspond with that of the lower substrate 120 in the upper periphery region other than the lower periphery region where the pad region is provided. However, the formation of the upper substrate 110 is not limited to the above example, and the upper substrate 110 may be extended longer than the lower substrate 120 even in the upper periphery region other than the lower periphery region where the pad region is provided.

Also, as shown in FIG. 3a, the panel driver 200, more specifically the circuit film 210 may be attached to the lower end of the upper substrate 110, whereby the pad region may be formed to reach the end of the display panel 100. However, as shown in FIGS. 3b and 3c, the panel driver 200, more specifically the circuit film 210 may not be attached to the lower end of the upper substrate 110, whereby the pad region may not be formed to reach the end of the display panel 100.

Also, as shown in FIGS. 3a and 3b, as the circuit film 210 may be arranged in a state folded once, the printed circuit board 220 may be arranged in a vertical direction with the display panel 100. As shown in FIG. 3c, as the circuit film 210 may be arranged in a state folded twice, the printed circuit board 220 may be arranged in a horizontal direction with the display panel 100.

Figure 4A:
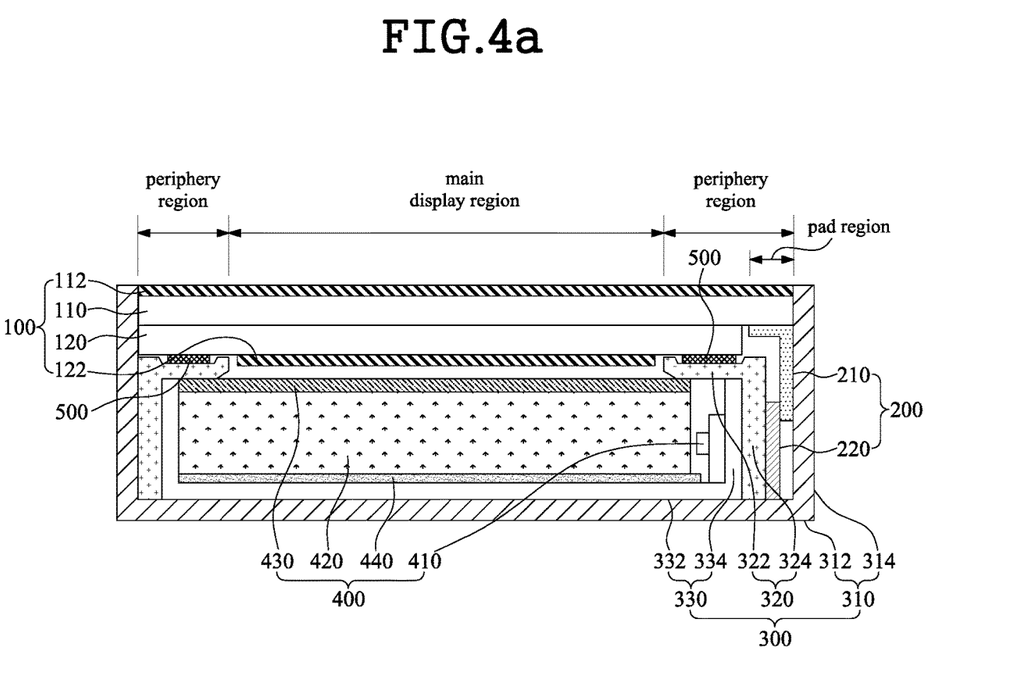
FIGS. 4a to 4c are cross-sectional views illustrating a liquid crystal display device according to various embodiments of the present invention.
Figure 4B:
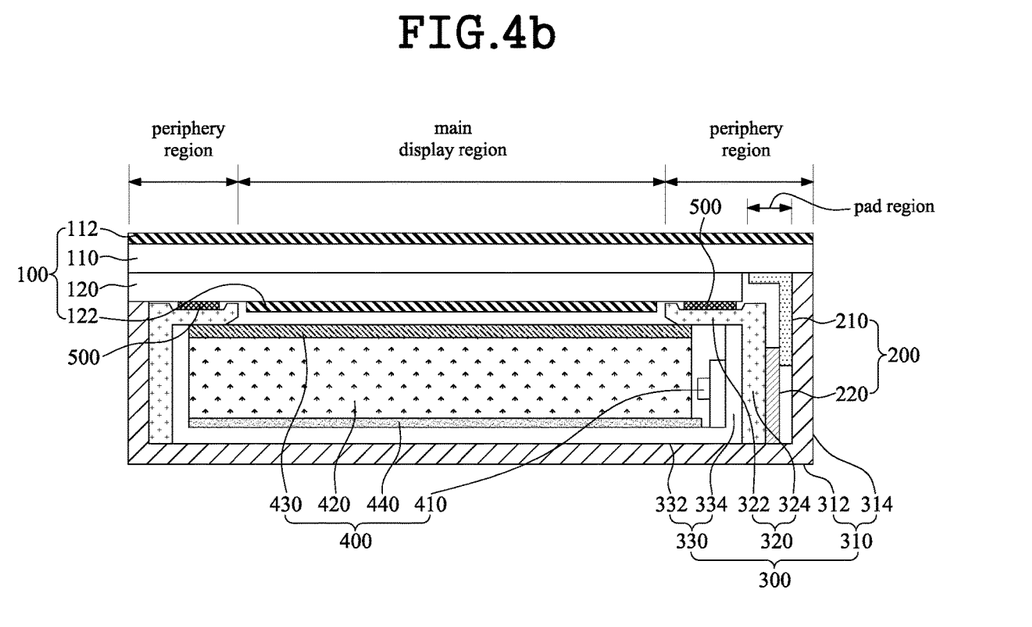
Figure 4C:
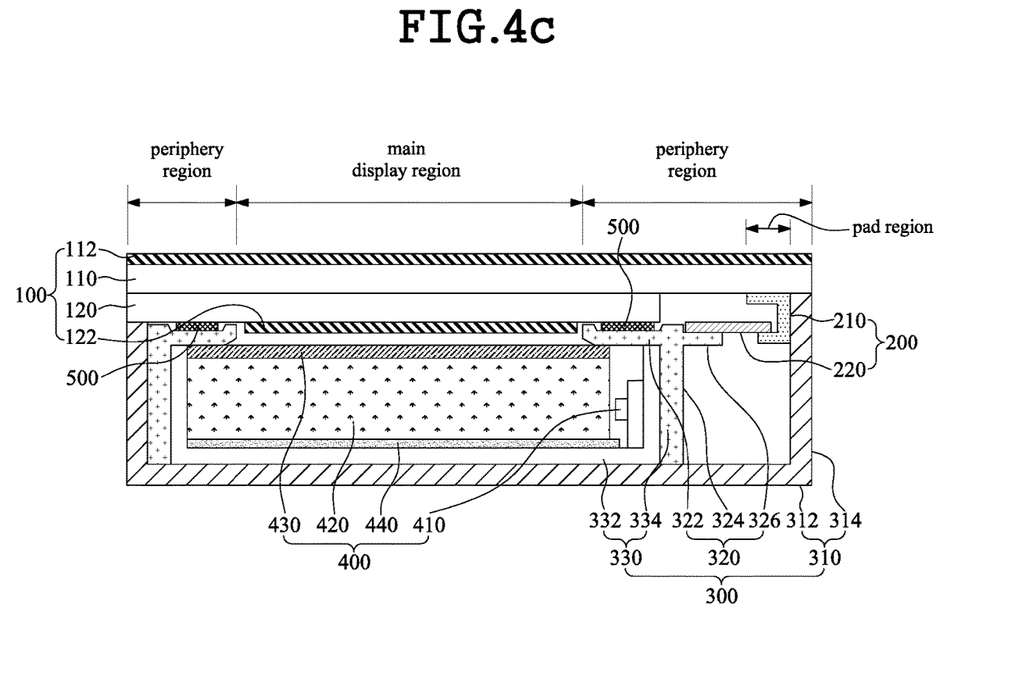

FIGS. 4a to 4c are cross-sectional views illustrating a liquid crystal display device according to various embodiments of the present invention, and correspond to sections taken along line I-I of FIG. 2. Hereinafter, each of the embodiments will be described in detail.

FIG. 4a is a cross-sectional view illustrating a liquid crystal display device according to one embodiment of the present invention.

As shown in FIG. 4a, the liquid crystal display device according to one embodiment of the present invention includes a display panel 100, a panel driver 200, a support member 300, a back light unit 400, and a coupling member 500.

The display panel 100 includes an upper substrate 110, an upper polarizing plate 112, a lower substrate 120, a lower polarizing plate 122, and a liquid crystal layer (not shown) formed between the upper substrate 110 and the lower substrate 120.

The upper polarizing plate 112 is formed on the upper surface of the upper substrate 110, and the lower polarizing plate 122 is formed on the lower surface of the lower substrate 120. Light transmittance is controlled by combination of the upper polarizing plate 112 and the lower polarizing plate 122, whereby picture image may be displayed.

Meanwhile, although not shown, a retarder film used to convert two-dimensional image to three-dimensional image may additionally be formed on the upper polarizing plate 112. Likewise, the retarder film may be formed in the following another embodiments.

Since the aforementioned display panel 100 is the same as that shown in FIG. 3a except that the upper polarizing plate 112 and the lower polarizing plate 122 are additionally formed, its repeated description will be omitted.

The panel driver 200 includes a circuit film 210 and a printed circuit board (PCB) 220. Since the panel driver 200 is the same as that shown in FIG. 3a, its repeated description will be omitted.

The support member 300 supports the display panel 100, the panel driver 200 and the back light unit 400, and serves as an external cover. In more detail, the support member 300 includes a set cover 310, a guide frame 320, and a support case 330.

The set cover 310 serves as an external cover of the display device such as a notebook computer. Particularly, the set cover 310 serves as a lower and side cover of the display device. To this end, the set cover 310 includes a plate 312 and a sidewall 314 extended and bent from one end of the plate 312.

The plate 312 serves as a lower cover of the display device, and the sidewall 314 serves as a side cover of the display device. The sidewall 314 is formed to face the side of the display panel 100. Accordingly, the sidewall 314 includes a bezel of the display device, whereby a width of the bezel is reduced more remarkably than that of the related art. At this time, as the height of the sidewall 314 corresponds with that of the display panel 100, the front surface of the display panel has a flat surface.

The set cover 310 is provided with a predetermined receiving space by coupling between the plate 312 and the sidewall 314. The display panel 100, the panel driver 200, the guide frame 320, the support case 330 and the back light unit 400 are received in the receiving space.

The guide frame 320 serves to guide the location of the back light unit 400 and support the display panel 100. To this end, the guide frame 320 includes a first support portion 322 and a first guide portion 324.

The first support portion 322 supports the lower surface of the display panel 100, especially the lower corner of the lower substrate 120, and the first guide portion 324 is extended from the first support portion 322 and guides the location of the back light unit 400 together with the support case 330. Also, the printed circuit board (PCB) 220 of the panel driver 200 may be fixed to the first guide portion 324 by a double-sided adhesive.

The support case 330 serves to guide the location of the back light unit 400 and support the back light unit 400. To this end, the support case 330 includes a second support portion 332 and a second guide portion 334.

The second support portion 332 supports the lower surface of the back light unit 400, and the second guide portion 334 is extended from the second support portion 332 and guides the location of the back light unit 400 while facing the side of the back light unit 400.

The support case 330 may also serve to uniformly transfer and emit heat generated from the back light unit 400. Namely, since heat is generated from the back light unit 400, a radiator may be required to emit heat generated from the back light unit 400. Accordingly, if the support case 330 is formed of a material such as metal that enables heat conduction, heat generated from the back light unit 400 may externally be transferred through the support case 330.

However, the support case 330 may be omitted as the case may be. In this case, the back light unit 400 may be supported by the aforementioned set cover 310.

Coupling among the set cover 310, the guide frame 320, and the support case 330, which constitute the support member 300, that is, coupling between the set cover 310 and the guide frame 320, coupling between the set cover 310 and the support case 330, or coupling between the guide frame 320 and the support case 330 may be carried out using a double-sided adhesive or hook coupling based on groove and projection. As the case may be, the coupling may be carried out using bolt and nut.

The back light unit 400 is located below the display panel 100, and serves to supply light to the display panel 100. As described above, the location of the back light unit 400 is guided by the guide frame 320 and the support case 330.

The back light unit 400 may be divided into a direct type back light unit and an edge type back light unit, wherein the direct type back light unit directly transfers light emitted from a light source arranged on the entire lower surface of the display panel 100 to the display panel 100, and the edge type back light unit transfers light emitted from a light source arranged at one side below the display panel 100 to the display panel 100 through a light guide plate. Either direct type back light unit or the edge type back light unit may be applied to the present invention. In other words, although the edge type back light unit 400 is shown, the present invention is not limited to the edge type back light unit 400.

The back light unit 400 includes a light source 410, a light guide plate 420, an optical sheet 430, and a reflecting plate 440.

The light source 410 is arranged to face a side of the light guide plate 420. The light emitted from the light source 410 enters the light guide plate 420 and then its path is changed to the display panel 100. A light emitting diode or a fluorescent lamp may be used as the light source 410.

The light guide plate 420 serves to change a path of the light emitted from the light source 410 to the display panel 100. In this way, to change the light path, although not shown, various types of grooves or projection patterns are formed on the light guide plate 420.

The optical sheet is formed on the light guide plate 420 to uniformly supply the light to the display panel 100, and may be made of combination of a diffusion sheet and a prism sheet.

The reflecting plate 440 is formed below the light guide plate 420, and serves to upwardly reflect the light leaked below the light guide plate 420 to increase light efficiency.

The coupling member 500 serves to couple the display panel 100 with the support member 300. In more detail, the coupling member 500 is formed between the display panel 100 and the guide frame 320 to couple the display panel 100 to the guide frame 320, thereby preventing the display panel 100 from being upwardly detached. An adhesive such as a double-sided tape may be used as the coupling member 500.

Meanwhile, as the lower polarizing plate 122 of the display panel 100 is not formed in the region where the coupling member 500 is formed, i.e., the coupling member 500 is formed between the lower substrate 120 and the first support portion 322 of the guide frame 320, the thickness of the display device may be prevented from being increased due to the additional coupling member 500.

FIG. 4b is a cross-sectional view illustrating a liquid crystal display device according to another embodiment of the present invention.

As shown in FIG. 4b, the liquid crystal display device according to another embodiment of the present invention includes a display panel 100, a panel driver 200, a support member 300, a back light unit 400, and a coupling member 500.

The display panel 100 includes an upper substrate 110, an upper polarizing plate 112, a lower substrate 120, a lower polarizing plate 122, and a liquid crystal layer (not shown) formed between the upper substrate 110 and the lower substrate 120. Since this display panel 100 is the same as that shown in FIG. 3b except that the upper polarizing plate 112 and the lower polarizing plate 122 are additionally formed, its repeated description will be omitted.

The panel driver 200 includes a circuit film 210 and a printed circuit board (PCB) 220. Since this panel driver 200 is the same as that shown in FIG. 3b, its repeated description will be omitted.

The support member 300 includes a set cover 310, a guide frame 320, and a support case 330. Since the support member 300 is the same as that shown in FIG. 4a except for the set cover 310, the set cover will be described only.

As shown in FIG. 4b, the set cover 310 includes a plate 312 and a sidewall 314 extended and bent from one end of the plate 312. At this time, the sidewall 314 is formed to be in contact with the lower surface of the display panel not the side of the display panel 100.

Particularly, since the upper substrate 110 is more extended than the lower substrate 120 in the periphery region of the display panel 100 where the pad region is provided, the sidewall 314 is formed to be in contact with the lower surface of the upper substrate 110 of the display panel 100. Since the end of the lower substrate 120 corresponds with that of the upper substrate 110 in the periphery region of the display panel 100 where the pad region is not provided, the sidewall 314 is formed to be in contact with the lower surface of the lower substrate 120 of the display panel 100. However, the upper substrate 110 may be more extended than the lower substrate 120 in the periphery region of the display panel 100 where the pad region is not provided. In this case, the sidewall 314 is formed to be in contact with the lower surface of the upper substrate 110 of the display panel 100.

As described above, in case of the structure based on FIG. 4b, since the sidewall 314 is formed to be contact with the lower surface of the display panel 100, the bezel of the display device is completely removed, whereby a sense of beauty may be increased.

Also, since the sidewall 314 is not in contact with the side of the display panel 100, the front surface of the display device includes the display panel 100 only.

The back light unit 400 includes a light source 410, a light guide plate 420, an optical sheet 430, and a reflecting plate 440. Since this back light unit 400 is the same as that shown in FIG. 4a, its repeated description will be omitted.

Since the coupling member 500 is the same as that shown in FIG. 4a, its repeated description will be omitted.

FIG. 4c is a cross-sectional view illustrating a liquid crystal display device according to still another embodiment of the present invention.

As shown in FIG. 4c, the liquid crystal display device according to still another embodiment of the present invention includes a display panel 100, a panel driver 200, a support member 300, a back light unit 400, and a coupling member 500.

The display panel 100 includes an upper substrate 110, an upper polarizing plate 112, a lower substrate 120, a lower polarizing plate 122, and a liquid crystal layer (not shown) formed between the upper substrate 110 and the lower substrate 120. Since this display panel 100 is the same as that shown in FIG. 3c except that the upper polarizing plate 112 and the lower polarizing plate 122 are additionally formed, its repeated description will be omitted.

The panel driver 200 includes a circuit film 210 and a printed circuit board (PCB) 220. Since this panel driver 200 is the same as that shown in FIG. 3c, its repeated description will be omitted.

The support member 300 includes a set cover 310, a guide frame 320, and a support case 330. Since the support member 300 is the same as that shown in FIG. 4a except for the set cover 310 and the guide frame 320, the set cover 310 and the guide frame 320 will be described only.

As shown in FIG. 4c, the set cover 310 includes a plate 312 and a sidewall 314. At this time, the sidewall 314 is formed to be in contact with the lower surface of the display panel not the side of the display panel 100.

Also, the guide frame 320 further includes a third support portion 326 in addition to a first support 322 and a first guide portion 324. The third support portion 326 is to support the printed circuit board (PCB) 220 of the panel driver 200.

Since the back light unit 400 and the coupling member 500 are the same as those shown in FIG. 4a, their repeated description will be omitted.

Figure 5A:
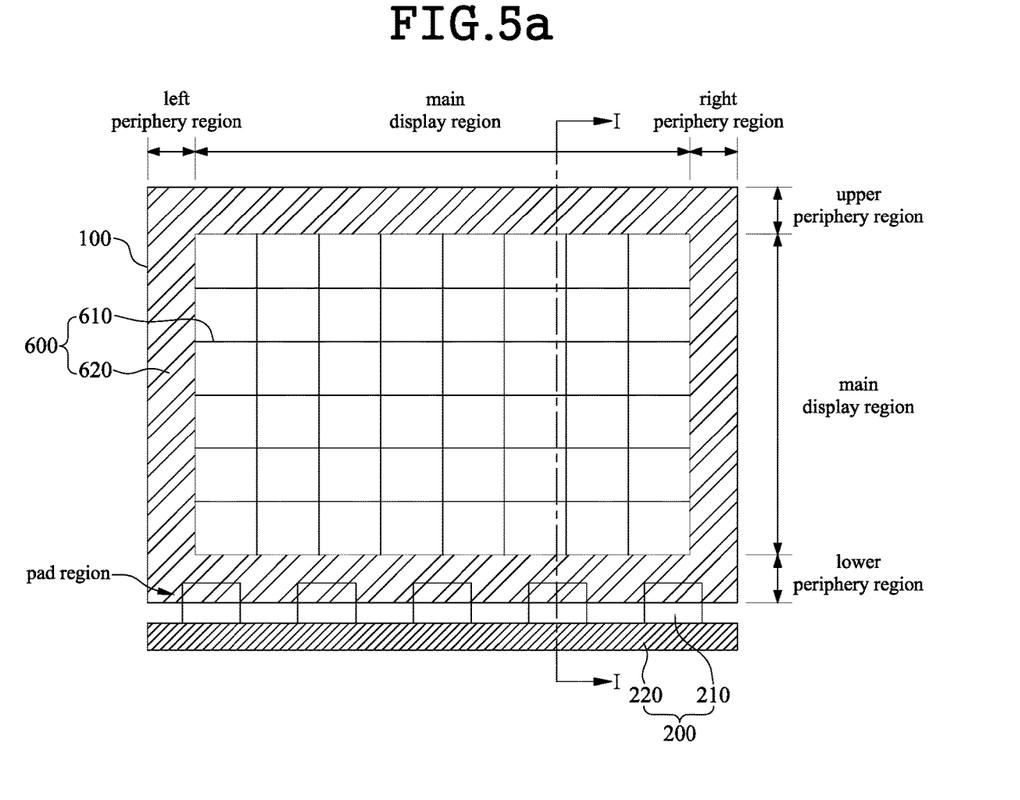
FIG. 5a is a plane view illustrating a display device according to another embodiment of the present invention.
Figure 5B:
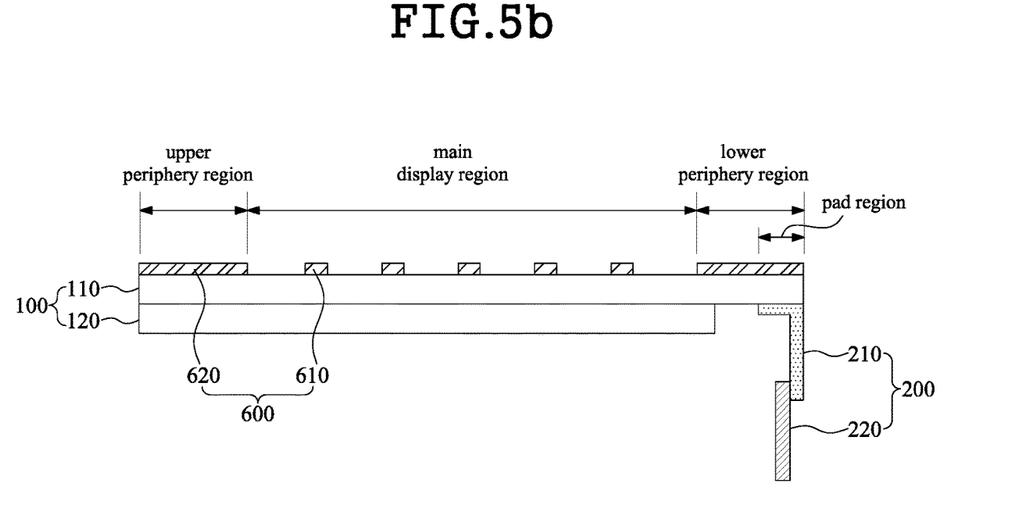
FIG. 5b is a cross-sectional view taken along line I-I.

FIG. 5a is a plane view illustrating a display device according to another embodiment of the present invention, and FIG. 5b is a cross-sectional view taken along line I-I.

As shown in FIGS. 5a and 5b, the display device according to another embodiment of the present invention includes a display panel 100, a panel driver 200 and a light shielding member 600.

In the same manner as the aforementioned embodiment, the display panel 100 includes a main display region and a sub display region. Also, the display panel 100 includes an upper substrate 110 and a lower substrate 120. The upper substrate 100 and the lower substrate 120 may be modified in various manners as shown in FIGS. 3a to 3c.

The panel driver 200 is formed in the periphery region of the display panel 100 provided with the pad region. The panel driver 200 may be modified in various manners as shown in FIGS. 3a to 3c.

The light shielding member 600 is formed on the upper surface of the display panel 100 and serves to shield external light from being reflected.

As described above, a plurality of gate lines and data lines are formed on the upper substrate 110 of the display panel 100, more specifically the lower surface of the upper substrate 110, wherein the gate lines cross the data lines. Accordingly, the external light enters the upper substrate 110 and then is reflected on the gate lines and the data lines, whereby picture quality may be deteriorated.

In another embodiment of the present invention, to solve the problem that the external light is reflected on the gate lines and the data lines, the light shielding member 600 is formed on the upper surface of the display panel 100.

Although the light shielding member 600 may be formed on the upper surface of the upper substrate 110 as shown, it may be formed on the upper surface of the upper polarizing plate in the case that the upper polarizing plate is formed on the upper surface of the upper substrate 110. Also, in the case that the retarder film used to convert two-dimensional image to three-dimensional image is additionally formed on the upper surface of the upper polarizing plate, the light shielding portion 600 may be formed on the upper surface of the retarder film, or may be formed between the upper surface of the upper polarizing plate and the retarder film.

The light shielding member 600 includes a first light shielding member 610 formed within the main display region of the display panel 100 and a second light shielding member 620 formed within the periphery region of the display panel 100.

The first light shielding member 610 is to shield the external light from being reflected on the gate lines and the data lines. Accordingly, the first light shielding member 610 is formed by a pattern corresponding to the gate lines and the data lines.

The second light shielding member 620 is to shield the external light generated from the periphery region of the display panel 100 from being reflected and prevent light leakage from occurring in the periphery region of the display panel 100. Accordingly, the second light shielding member 620 may be formed over the entire periphery region of the display panel 100. However, the second light shielding member 620 may not be formed in a part of the periphery region of the display panel 100. For example, the sub display region displaying sub screen may be formed in the periphery region. In this case, the second light shielding member 620 is not formed in the sub display region.

The light shielding member 600 that includes the first light shielding member 610 and the second light shielding member 620 may be formed using a printing method known in the art, such as a roll printing method.

Meanwhile, it is not required that the light shielding member 600 should be formed on the upper surface of the upper substrate 110 or the upper surface of the upper polarizing plate. The light shielding member 600 may also be formed at a pattern between the upper substrate 110 and the gate lines and data lines, and the pattern corresponds to the gates lines and data lines. In the case that the light shielding member 600 is formed on the lower surface of the upper substrate 110, the gate lines and the data lines are formed on the lower surface of the light shielding member 600. Namely, it is sufficient that the light shielding member 600 is formed above the gate lines and the data lines, and various modifications may be made in the location of the light shielding member 600.

As the case may be, the first light shielding member 610 and the second light shielding member 620 may be formed on their respective layers different from each other. For example, the first light shielding member 610 may be formed on the upper surface of the upper substrate 110, and the second light shielding member 620 may be formed on the lower surface of the upper substrate 110. Also, the first light shielding member 610 may be formed on the upper surface of the upper polarizing plate, and the second light shielding member 620 may be formed on the upper surface of the upper substrate 110.

Figure 6:
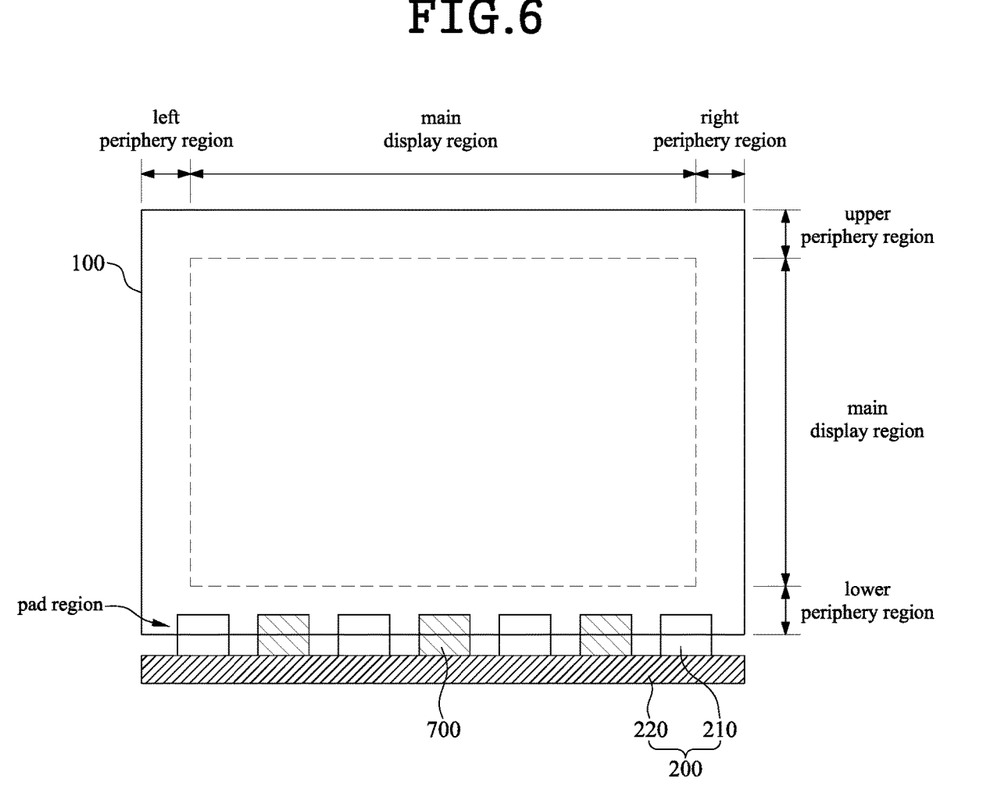
FIG. 6 is a plane view illustrating a display device according to still another embodiment of the present invention.

FIG. 6 is a plane view illustrating a display device according to still another embodiment of the present invention.

As shown in FIG. 6, the display device according to still another embodiment of the present invention includes a display panel 100, a panel driver 200, and a dummy film 700.

In the same manner as the aforementioned embodiment, the display panel 100 includes a main display region and a sub display region. Also, the display panel 100 may be modified in various manners as described above, and its repeated description will be omitted.

The panel driver 200 is formed in the periphery region of the display panel 100, and includes a circuit film 210 and a printed circuit board 220 in the same manner as the aforementioned embodiment. Various modifications may be made in the location of the panel driver 200 as described above.

The dummy film 700 serves to couple the panel driver 200 to the display panel 100 more stably. In other words, according to the present invention, since the panel driver 200 is attached to the lower surface of the upper substrate constituting the display panel 100, coupling between the panel driver 200 and the display panel 100 may be weakened.

Accordingly, in still another embodiment of the present invention shown in FIG. 6, the dummy film 700 is additionally formed to reinforce coupling between the panel driver 200 and the display panel 100. As shown, the dummy film 700 may be coupled to each of the upper substrate of the display panel and the printed circuit board 220 of the panel driver 200 in the region between the respective circuit films 210 spaced apart from each other.

The dummy film 700 is to reinforce coupling between the panel driver 200 and the display panel 100 and has no relation with signal transfer between the panel driver 200 and the display panel 100. Accordingly, a chip or signal lines are not formed on the dummy film 700.

Meanwhile, in order to reinforce coupling between the panel driver 200 and the display panel 100 through the dummy film 700, it is preferable to reinforce coupling force between the dummy film 700 and the display panel 100 and coupling force between the dummy film 700 and the printed circuit board 200. To this end, a bonding pad may be formed on the dummy film 700 at a predetermined pattern, and will be described with reference to FIGS. 7a to 7c.

Figure 7A:
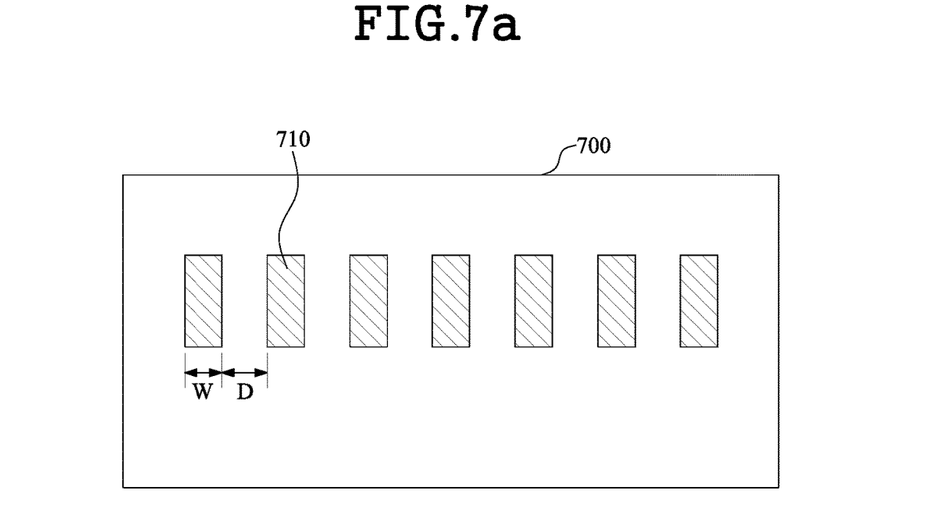
FIGS. 7a to 7c are plane views illustrating a dummy film according to various embodiments of the present invention.
Figure 7B:
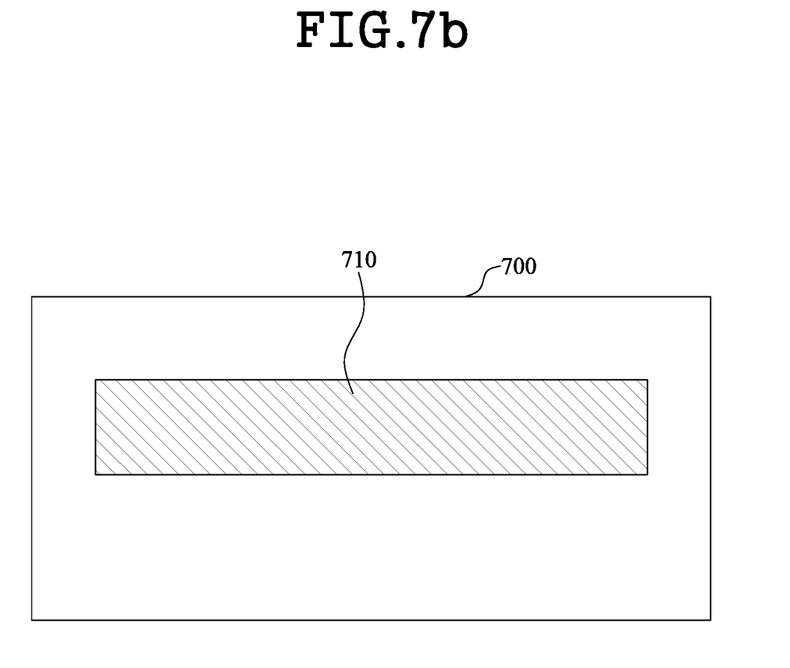
Figure 7C:
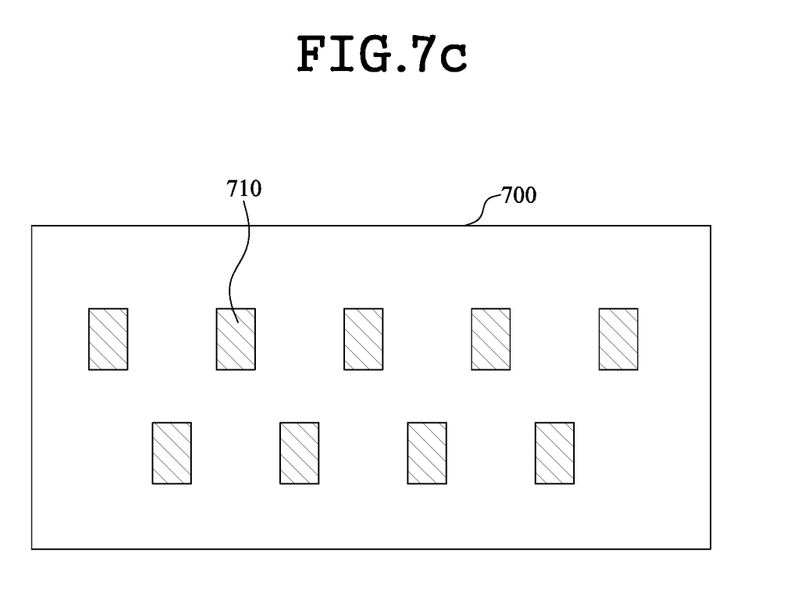

FIGS. 7a to 7c are plane views illustrating a dummy film according to various embodiments of the present invention.

As shown in FIGS. 7a to 7c, a bonding pad 710 is formed on the dummy film 700.

The bonding pad 710 is formed in the region coupled to the aforementioned printed circuit board 220 and the region coupled to the upper substrate of the display panel 100. The same bonding pad 710 may be formed at a position corresponding to the upper substrate of the display panel 100 and the printed circuit board 220.

As shown in FIG. 7a, the bonding pad 710 may be formed in such a manner that a plurality of bonding pads are spaced apart from one another at predetermined intervals. Each width W of the plurality of bonding pads 710 may be the same as or different from the distance D between the respective bonding pads 710. To reinforce coupling, it is preferable that each width W of the plurality of bonding pads 710 is greater than the distance D between the respective bonding pads 710.

As shown in FIG. 7b, the bonding pad 710 may be formed in the entire region coupled to the aforementioned printed circuit board 220 or the display panel 100.

As shown in FIG. 7c, the bonding pads 710 may be formed in a zigzag structure.

Figure 8:
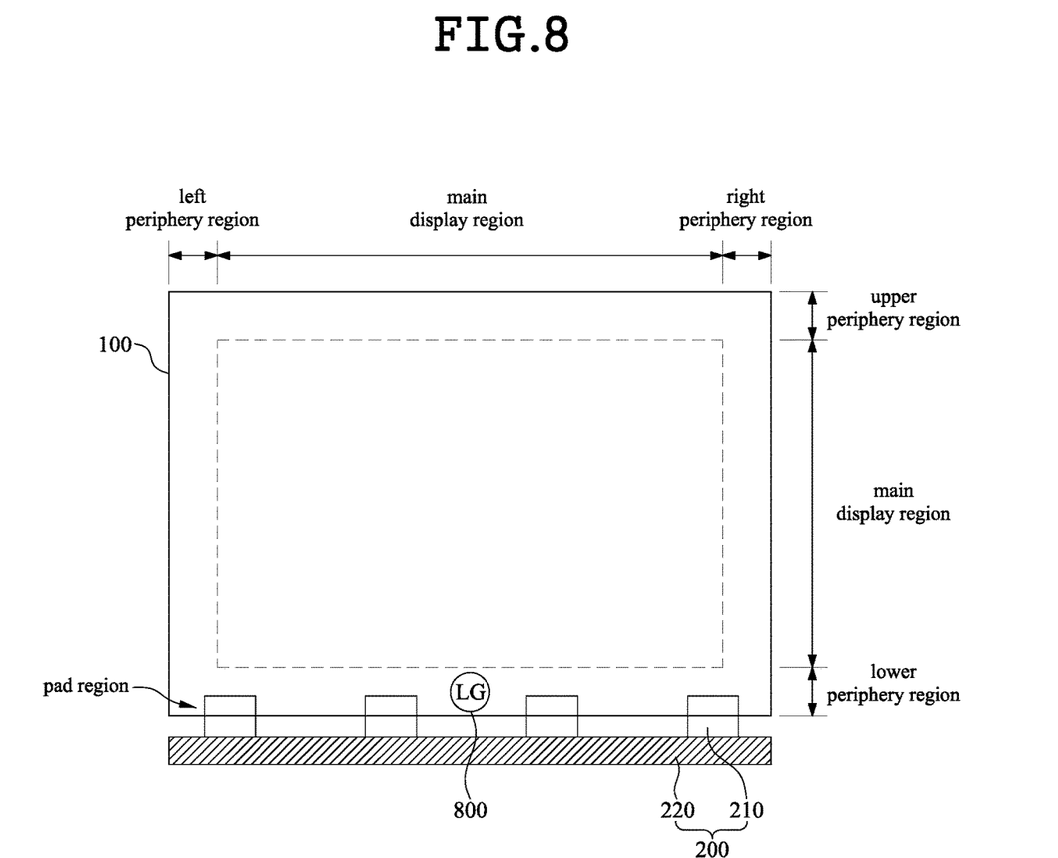
FIG. 8 is a plane view illustrating a display device according to further still another embodiment of the present invention.

FIG. 8 is a plane view illustrating a display device according to further still another embodiment of the present invention.

As shown in FIG. 8, the display device according to further still another embodiment of the present invention includes a display panel 100, a panel driver 200, and a sub display device 800.

The display panel 100 and the panel driver 200 may be modified in various manners as described above, and their repeated description will be omitted.

The sub display device 800 is to display manufacturer logo, etc. and a sub display region is formed by the sub display device 800. Various display devices known in the art, such as LED device, OLED device, . . . etc. may be used as the sub display device 800.

The sub display device 800 is formed in the periphery region of the display panel 100. Particularly, the sub display device 800 may be formed in the periphery region where the panel driver 200 is formed, i.e., the periphery region provided with the pad region. In this case, although the sub display device 800 may be formed in the region between the respective circuit films 210 of the panel driver 200, it may be formed above the circuit films 210. However, it is preferable in view of space aspect that the sub display device 800 is formed in the region between the respective circuit films 210.

Figure 9A:
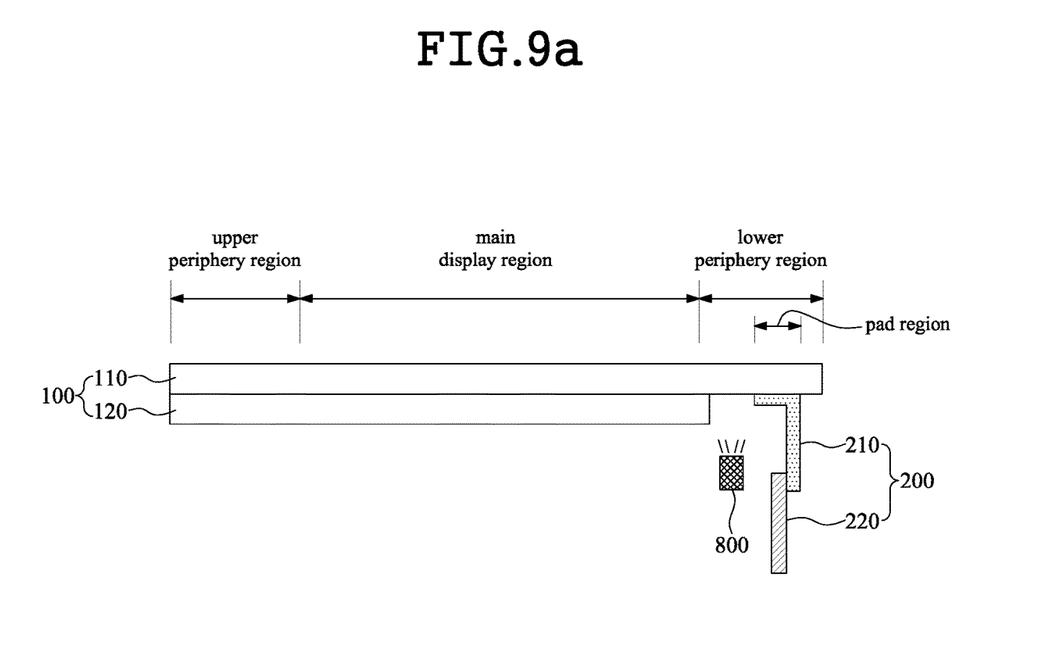
FIGS. 9a and 9b are cross-sectional views illustrating a display device according to further still another embodiment of the present invention.
Figure 9B:
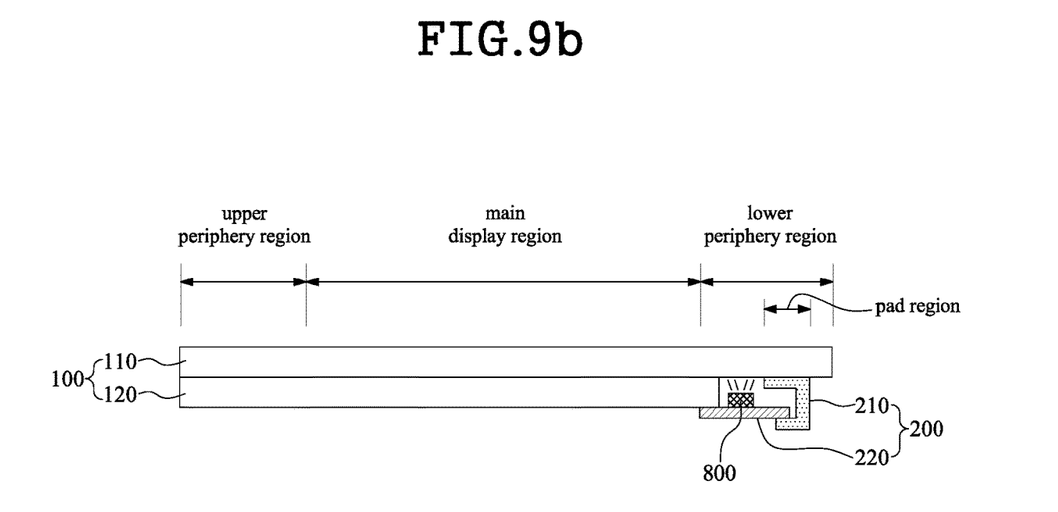

FIGS. 9a and 9b are cross-sectional views illustrating a display device according to further still another embodiment of the present invention, and particularly illustrate the formation position of the sub display device 800 in the display device of FIG. 8.

As shown in FIGS. 9a and 9b, the sub display device 800 may be formed below the periphery region of the display panel 100, especially below the upper substrate 110 in the region where the lower substrate 120 is not formed.

At this time, the sub display device 800 may be formed at a position close to the printed circuit board 200 in the structure that the printed circuit board 200 of the panel driver 200 is arranged in a vertical direction with the display panel 100 as shown in FIG. 9a.

Also, the sub display device 800 may be formed on the upper surface of the printed circuit board 200 in the structure that the printed circuit board 200 of the panel driver 200 is arranged in a horizontal direction with the display panel 100 as shown in FIG. 9b. In addition, the light shielding member 600 shown in FIGS. 5a and 5b may be formed on the periphery region except the region corresponding to the sub display device 800.

Although the liquid crystal display device which is one of the display devices has been described as above, the display device according to the present invention is not limited to the aforementioned liquid crystal display device, and may be various display devices such as an organic light emitting display device.

As described above, the display device according to the present invention has the following advantages.

Since the panel driver is attached to the lower surface of the upper substrate, the panel driver is not exposed to the front surface of the display device, whereby a separate external case is not required on the upper surface of the upper substrate to cover the panel driver unlike the related art. Accordingly, the thickness of the display device is reduced and front step difference of the display device is removed, whereby the front surface of the display device is recognized as one structure to obtain esthetic design effect.

In addition, the bezel of the display device may completely be omitted. Even though the bezel is formed, its width is very small, whereby a sense of beauty may be improved as compared with the related art.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A display device, comprising:
a display panel including a main display region and a periphery region outside the main display region;
a panel driver connected with the display panel in the periphery region of the display panel;
a support member supporting the display panel and the panel driver, the support member including a set cover serving as an external cover and a guide frame supporting the display panel; and
a coupling member for coupling the display panel to the support member,
wherein the display panel includes an upper substrate and a lower substrate under a lower surface of the upper substrate, gate lines and data lines are provided on the lower substrate of the upper substrate,
wherein the lower substrate exposes a pad region provided on the lower surface of the upper substrate, and the panel driver is connected to the pad region provided on the lower surface of the upper substrate,
wherein the coupling member couples a lower surface of the lower substrate and an upper surface of the guide frame, wherein the set cover comprises a plate provided under the display panel, the panel driver and the guide frame, a first side wall extending in a first direction from a first end of the plate, and a second side wall extending in the first direction from a second end of the plate, wherein the guide frame comprises a first support portion supporting a lower surface of the display panel, a first guide portion extending in the first direction from an end of the first support portion, a second support portion supporting the lower surface of the display panel, and a second guide portion extending in the first direction from an end of the second support portion, wherein the panel driver extends in the first direction from the lower surface of the upper substrate to a space between the first side wall and the first guide portion, wherein the first side wall is in contact with the upper substrate and is not in contact with the lower substrate and the first guide portion, and wherein the second side wall is in contact with the upper substrate, the lower substrate, and the second guide portion.

2. The display device of claim 1, wherein the upper substrate is extended longer than the lower substrate in the periphery region of the display panel provided with the pad region.

3. The display device of claim 1, wherein the panel driver includes a circuit film attached to the pad region and a printed circuit board connected with the circuit film, and the printed circuit board is arranged in a horizontal direction or vertical direction with the display panel.

4. The display device of claim 1, further comprising a back light unit located below the display panel, supplying light to the display panel, the back light unit being supported by the support member.

5. The display device of claim 1, wherein the first and the second side walls of the set cover face a side of the display panel.

6. The display device of claim 1, wherein the coupling member is provided between the lower surface of the lower substrate and the first support portion of the guide frame.

7. The display device of claim 6, wherein the guide frame further includes a third support portion supporting the printed circuit board of the panel driver.

8. The display device of claim 1, further comprising a light shielding member for preventing external light from being reflected.

9. The display device of claim 8, wherein the light shielding member includes a first light shielding member provided in the main display region and a second light shielding member provided in the periphery region, the first light shielding member being provided on the upper substrate at a pattern corresponding to the gate and data lines provided on the lower surface of the upper substrate.

10. The display device of claim 8, wherein the light shielding member is provided at a pattern above the gate and data lines, and the pattern corresponds to the gate and data lines.

11. The display device of claim 1, further comprising a dummy film additionally connected between the panel driver and the display panel.

12. The display device of claim 11, wherein the dummy film is coupled to each of the printed circuit board of the panel driver and the upper substrate of the display panel, and bonding pads are provided in a region of the dummy film coupled to the printed circuit board and the upper substrate.

13. The display device of claim 12, wherein the bonding pads are spaced apart from one another at predetermined intervals, provided in an entire region coupled to the printed circuit board and the upper substrate, or provided in a zigzag structure.

14. The display device of claim 1, further comprising a sub display device in the periphery region of the display panel.

15. The display device of claim 14, wherein the sub display device is provided in the periphery region where the pad region is provided.

16. The display device of claim 15, wherein the sub display device is one of LED device, and OLED device.

17. The display device of claim 15, wherein a light shielding member is provided on the periphery region except a region corresponding to the sub display device.

18. The display device of claim 15, wherein the pad driver includes a printed circuit board arranged in a vertical direction with the display panel, and the sub display device is provided at a position close to the printed circuit board.

19. The display device of claim 15, wherein the pad driver includes a printed circuit board arranged in a horizontal direction with the display panel, and the sub display device is provided on an upper surface of the printed circuit board.

20. The display device of claim 1, wherein an entire front surface of the display panel is externally exposed.

* * * * *